US007587706B2

(12) United States Patent
Maher et al.

(10) Patent No.: US 7,587,706 B2
(45) Date of Patent: Sep. 8, 2009

(54) METHOD TO PROVIDE SECURE MULTI-VENDOR SYSTEM SIZINGS

(75) Inventors: James H. Maher, Apex, NC (US); Howard Sykes, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 10/845,872

(22) Filed: May 14, 2004

(65) Prior Publication Data

US 2005/0268275 A1 Dec. 1, 2005

(51) Int. Cl.
*G06F 9/44* (2006.01)
*G06Q 30/00* (2006.01)
(52) U.S. Cl. .......................... 717/104; 705/26
(58) Field of Classification Search ............... 717/114, 717/130, 104; 709/203, 217, 223–226; 715/237; 705/26
See application file for complete search history.

(56) References Cited

U.S. PATENT DOCUMENTS

| | | | |
|---|---|---|---|
| 5,668,995 A | 9/1997 | Bhat | |
| 6,158,001 A | 12/2000 | Lee et al. | |
| 6,263,382 B1 | 7/2001 | Bartlett et al. | |
| 2002/0143819 A1* | 10/2002 | Han et al. | 707/513 |
| 2004/0064528 A1* | 4/2004 | Meredith et al. | 709/219 |
| 2004/0122926 A1* | 6/2004 | Moore et al. | 709/223 |

OTHER PUBLICATIONS

Uddi.org, "UDDI Technical White Paper", Sep. 2000, pp. 1-12 (see attached: UDDI_TechnicalPaper.pdf).*

* cited by examiner

*Primary Examiner*—Tuan Anh Vu
(74) *Attorney, Agent, or Firm*—Cynthia G. Seal; Law Office of Jim Boice

(57) ABSTRACT

A method for sizing a computer system. Toolsets defining required performance of a subsystem, as well as hardware and software resources available to the subsystem, are transmitted to a subsystem provider. The subsystem provider responds with information about a subsystem that specifically comports with the toolset's definitions of performance and available resources. Whether two subsystem providers respond to a same toolset for a same subsystem or to different toolsets for different subsystems, the two subsystem providers are blocked from viewing the other subsystem provider's response. Further, each subsystem provider's response includes only information needed to comport with the toolset, thus preventing unnecessary disclosure of specifications of the subsystem beyond those defined in the toolset.

20 Claims, 7 Drawing Sheets

Figure 6

Webpage sent from Subsystem provider to sizing server

File    Edit    Tools    Help

Specification for e-mail program supporting 75 users

Program name          | E-Mail ProServer |

Required attachment size   | 10 Megabytes |

Required HDD access time   | 6 ms |

Server interface      | IEEE 1394 |

Incompatible software | MS Outlook 6.0 |

Incompatible hardware | EIDE CD-ROM |

Price                 | $8,237.50 US |

600

METHOD TO PROVIDE SECURE MULTI-VENDOR SYSTEM SIZINGS

BACKGROUND OF THE INVENTION

1. Technical Field

The present invention relates in general to the field of computers, and in particular to sizing computer systems according to a customer's input. More particularly, the present invention relates to a method and computer program for creating a computer system, including hardware and software, that allows each subsystem provider to securely provide information about a particular subsystem without disclosing proprietary information about that subsystem.

2. Description of the Related Art

To optimally configure a computer system composed of multiple subsystems and meeting a customer's performance (capacity and throughput) requirements has traditionally required the use of scarce, highly-trained technical individuals who understand the total solution requirements of each subsystem, the interfaces between subsystems, and the ripple effect of changing each subsystem.

While computer-based sizing guides have been developed to aid in the process of sizing a system, such sizing guides generally still require a highly-trained system specialist to develop a sizing guide for each application (or environment). That is, such sizing guides still require the specialist to keep track of subsystem interactions and to have expertise in the area of hardware and software loads for particular needs.

Subsystem vendors may not wish to release performance factors of their solutions for fear that competitors will use these factors in competition against the subsystem vendor. For example, an e-mail program from a first vendor may require a total of 20 Megabytes of memory for a system with 10 users. Of the 20 Megabytes, 10 Megabytes may be required for the baseline system, and another 10 Megabytes may be required for the 10 users, each user requiring 1Megabyte of memory. If this level of performance detail were known to a second vendor, then the second vendor may be able to re-design his system to still require 20 Megabytes of memory, but requiring only 0.9 Megabytes of memory per user, thus appearing to be more efficient.

Sizing of a computer system needs to be a precise operation. That is, if the system is underpowered, either in the hardware or software, then performance will be lacking. Alternatively, if the system is overpowered, then there are wasted resources and the system's expense was higher than required. Either scenario is common when purchasing off-the-shelf software. Such software typically does not provide adequate configuration granularity to avoid configuring an overpowered or underpowered system.

What is needed therefore, is a method for sizing a computer system that permits separate independent development and hosting of each subsystem in the computer system, while also providing each subsystem provider adequate security to prevent unnecessary scrutiny of the subsystem's performance parameters.

SUMMARY OF THE INVENTION

The present invention is directed to a method for sizing a computer system. Toolsets defining required performance of a subsystem, as well as hardware and software resources available to the subsystem, are transmitted to a subsystem provider. The subsystem provider responds with information about a subsystem that specifically comports with the toolset's definitions of performance and available resources. Whether two subsystem providers respond to a same toolset for a same subsystem or to different toolsets for different subsystems, the two subsystem providers are blocked from viewing the other subsystem provider's response. Further, each subsystem provider's response includes only information needed to comport with the toolset, thus preventing unnecessary disclosure of specifications of the subsystem beyond those defined in the toolset.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 6 depicts an exemplary webpage, completed by the subsystem provider, of specifications for the subsystem that meet the requirements defined in FIG. 5, and also describing system needs of the subsystem.

DETAILED DESCRIPTION OF A PREFERRED EMBODIMENT

Figure 1:
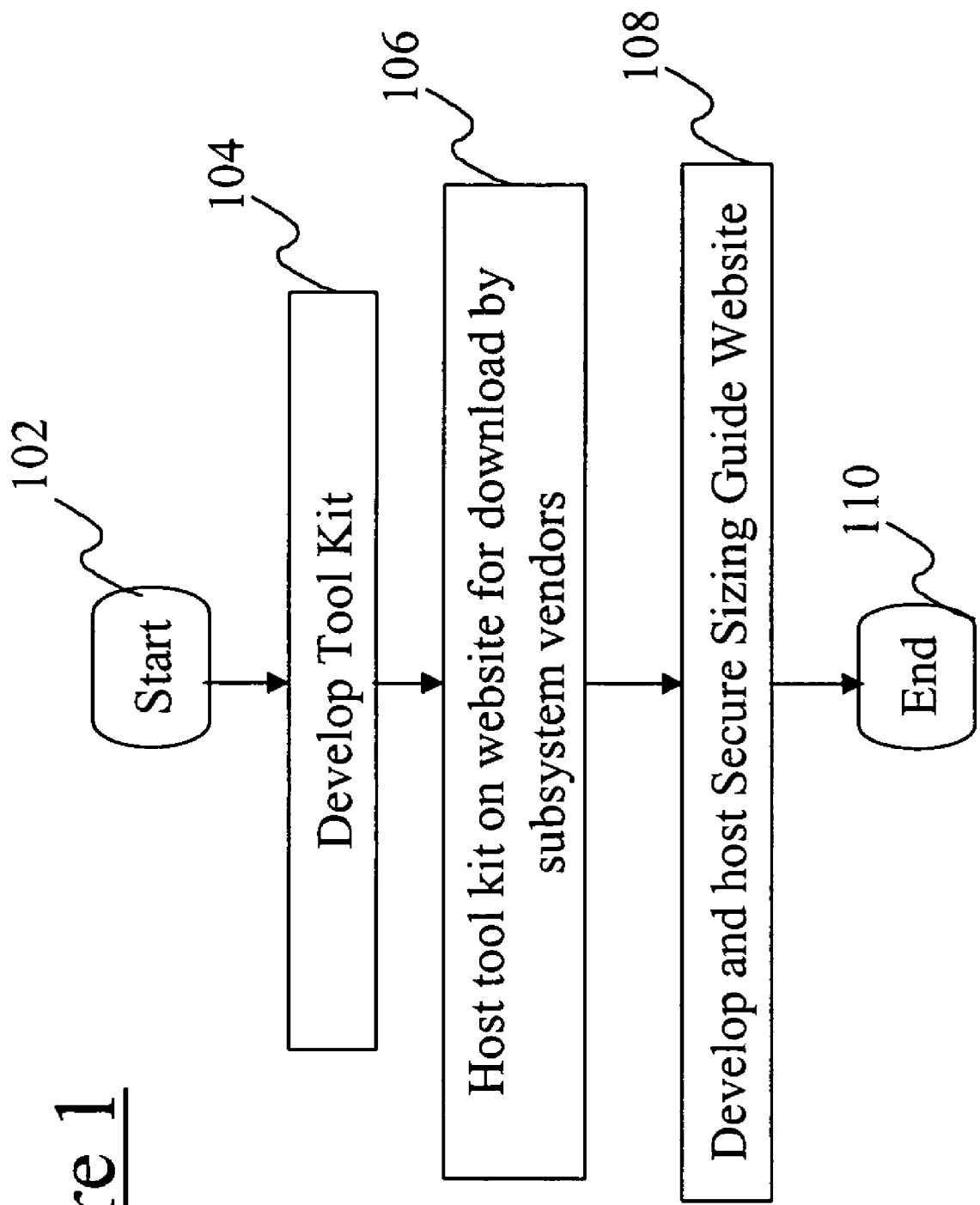
FIG. 1 is a flow-chart depicting the steps taken by the system integrator to create an environment which allows the following steps to be undertaken.
Figure 3:
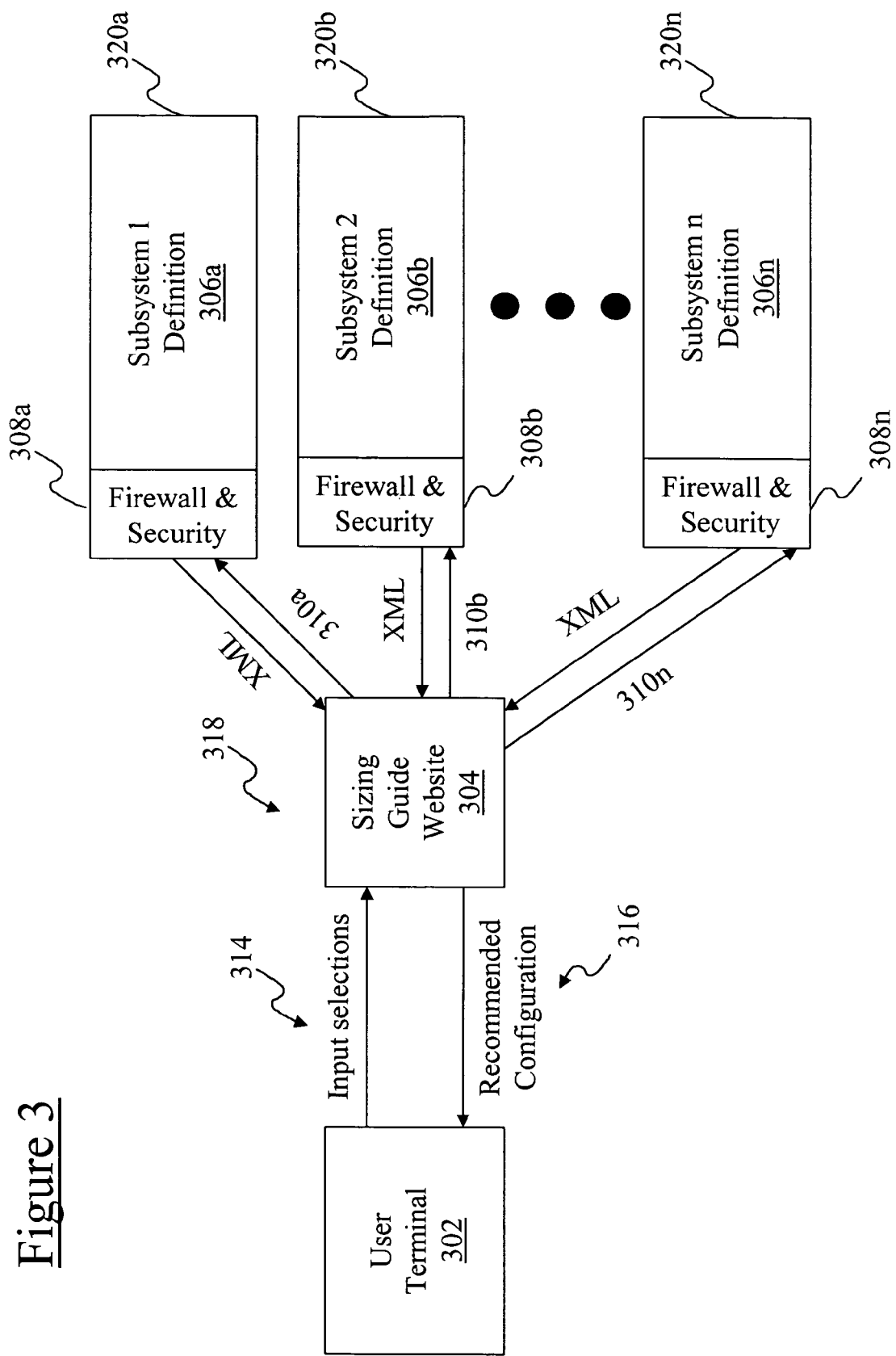
FIG. 3 illustrates system components used to provide the subsystem to the sizing server.

With reference now to the figures, and in particular to FIG. 1, there is depicted a flowchart of exemplary preferred steps taken by the systems integrator to create an automated environment that supports the security and integration of multiple subsystem vendors' components. Starting with initiator block 102, the subsystem vendor needs to develop a tool kit (block 104) which supports the fill-in-the-blanks (such as depicted in FIG. 6) approach that the subsystem vendor will use to define their subsystem (such as subsystem definitions 306x depicted in FIG. 3).

The systems integrator vendor hosts a site (block 106) which allows the subsystems vendors to download the tool kit (as described below in block 204 of FIG. 2) that was created in block 104 and develop a secure website (block 108). When completed, this secure website is hosted as shown in a sizing guide website 304 on a sizing server 318, shown in FIG. 3. This website (block 204) provides access to terminal users (block 202).

Figure 2:
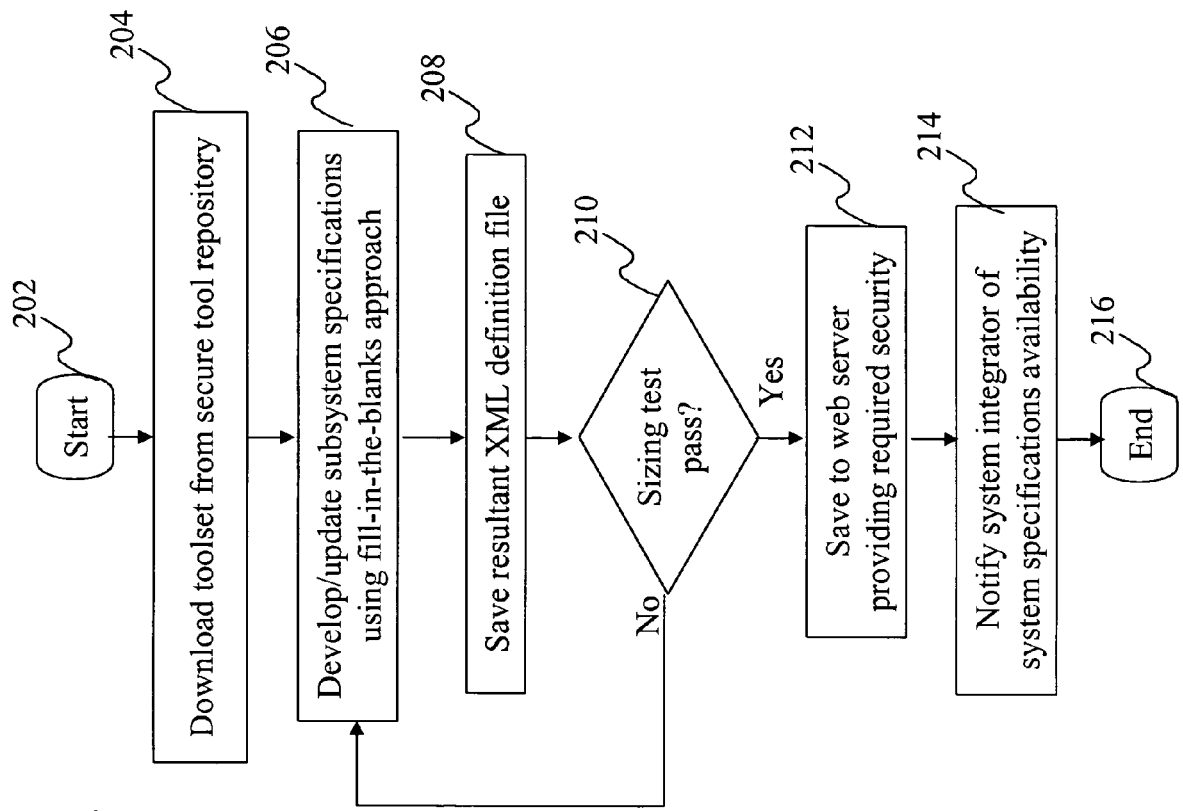
FIG. 2 is a flow-chart depicting steps taken to provide a subsystem to a sizing server.

With reference now to FIG. 2, there is depicted a flow-chart of exemplary preferred steps taken by a subsystem provider to create a subsystem that comports with the needs and requirements of a system integrator according to future customer's requirements. Starting with initiator block 202, a tool kit (as described in FIG. 1 with reference to block 104) is downloaded (block 204) by the subsystem vendor from the system integrator hosting website 304 (also seen in FIG. 3). The tool kit is downloaded from a secure tool repository maintained in a sizing server, such as a sizing server 318 seen in FIG. 3. The tool kit is used to define a set of performance parameters, including a definition of a performance capability of a subsystem, such as a subsystem server 320 depicted in FIG. 3, as well as a definition of hardware and software resources provided by, required by and in conflict with, (i.e., mutually exclusive, as described in further detail below with regards to FIG. 6), the requested subsystem.

For example, a toolset, preferably implemented as a set of software code, may describe desired parameters of a subsystem that is a software program. However, rather than defining sizing requirements at a level of detail that would require a highly skilled technical engineer, only high-level requirements are defined by the toolset. Details of an exemplary toolset are discussed below with reference to FIGS. 4-5.

Similarly, the toolset may describe the desired parameters of hardware subsystem. Again, the toolset is used to define characteristics at a subsystem-level. For example, if the desired hardware subsystem is a hard disk drive, then the toolset would define and describe performance parameters required (e.g., access time, power consumption, disk cache size, etc.) as well as the system resources available to the hard disk drive, including available hardware (bus interface to which the hard disk drive will be coupled) and software (operating system that will be controlling the hard disk drive).

Referring again to FIG. 2, the subsystem provider develops (or updates) subsystem specifications from the toolset (block 206), preferably using a fill-in-the-blanks approach. The resulting subsystem specification is then saved by the subsystem provider 320, preferably as an eXtended Markup Language (XML) definition file (block 208). Further detail of how this XML definition file is created is discussed below.

The subsystem provider then tests the definition file (query block 210), using specification parameters as would be defined by a customer at a user terminal 302 (described in further detail below) and interfacing with the sizing guide website 304. If the definition file passes the sizing test (meets the specification requirements defined by the toolset and the customer's specifications), then the subsystem definition is sent (block 212) to the secure sizing server 318 seen in FIG. 3. The system integrator operating the sizing server 318 is then notified of the availability of the subsystem (block 214), and the process ends (terminator block 216).

Figure 4:
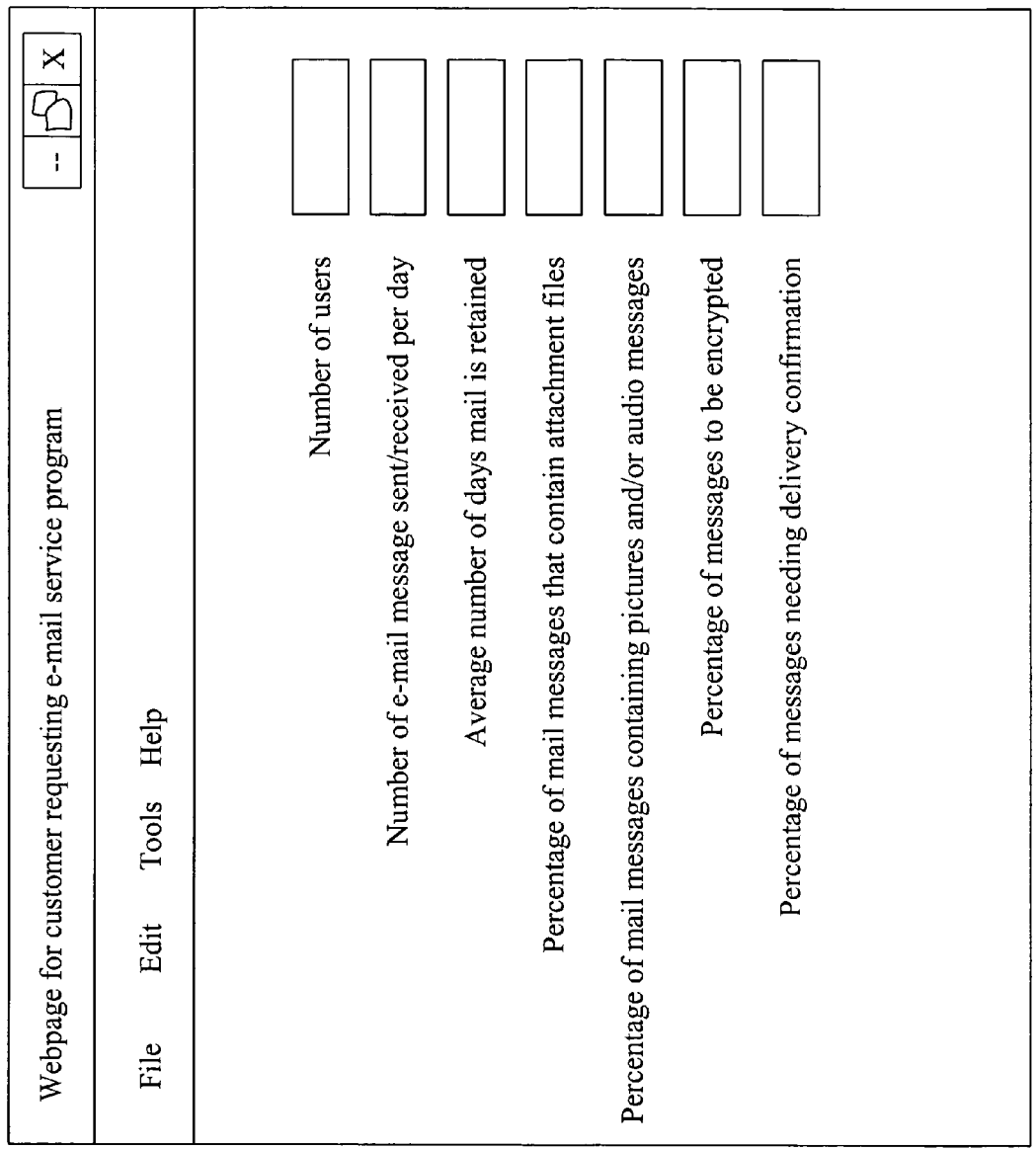
FIG. 4 depicts an exemplary webpage provided to a user terminal to obtain information needed to create a toolset describing the needs of a user.

With reference again to FIG. 3, there is illustrated a block-diagram of systems used in the present invention, with additional details showing steps taken by customers to help define appropriate subsystems. A user terminal 302, operated by a customer, transmits input selections 314 to sizing server 318, which the system integrator uses to host a sizing guide website 304. The input selections 314 comport with toolset parameters defined by the system integrator, such as shown in FIG. 4, showing a user webpage 400 that is provided to a customer using user terminal 302. The customer inputs selections, either in a "fill-in-the-blank" active area such as shown, or the customer may click a radio button or any other active area (not shown) of the user webpage 400.

Figure 5:
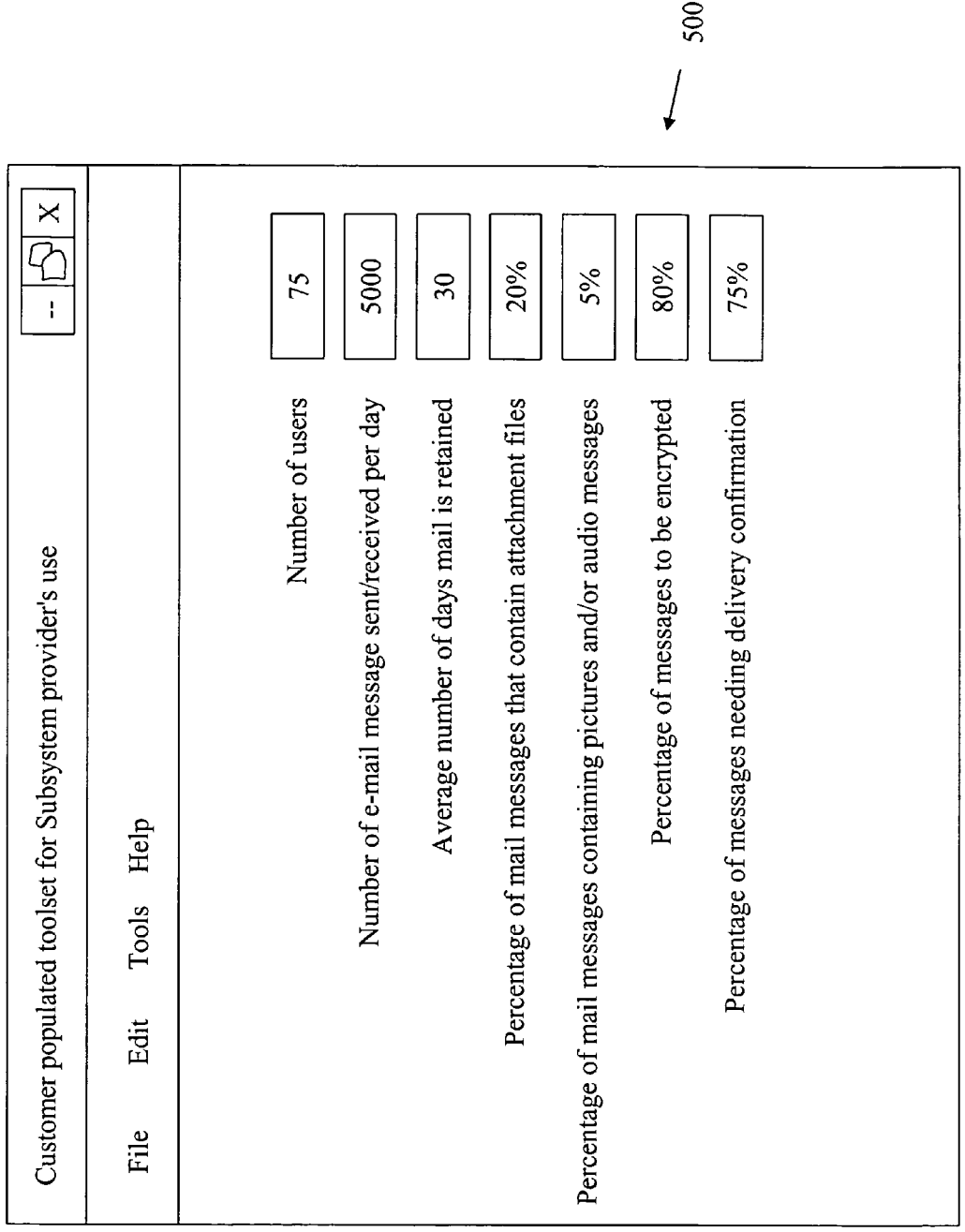
FIG. 5 illustrates the webpage depicted in FIG. 4, completed for use by a subsystem provider defining required performance capability of the subsystem.

With reference to FIG. 5, the customer has indicated a need for an e-mail system for 75 users, sending/receiving a total of no more than 5000 messages a day. The customer has also identified the average number of days that e-mail will be retained (30), the anticipated percentage of mail messages that will contain attachment files (20%), the anticipated percentage of mail messages that will contain video or audio attachments (5%), the percentage of messages that are to be encrypted (80%), and the percentage of messages that will need delivery confirmation (75%).

Referring again to FIG. 3, the input selections 314 chosen by the customer in FIG. 5 is sent to the sizing server 318, which then uses the customer input selections 314 to complete a specialized toolset 310, shown as toolsets 310a-n. Each toolset 310 may be the same (using the same input selections 314) or different (using different input selections 314 from the same customer). That is, toolset 310a and toolset 310b could be the same toolset defining parameters for the same hardware or software subsystem, or toolset 310a and toolset 310b may be for different subsystems, either hardware or software.

If toolsets 310a and 310b are the same, then a system integrator who is operating sizing server 318 can select the most desirable (e.g., best performance based on cost) available subsystem definition 306 (i.e., subsystem 1 definition 306a and subsystem 2 definition 306b) from the different subsystem servers 320a and 320b.

Each subsystem server 320 responds, if possible, with a subsystem definition 306 that comports with the requirements of the toolset 310 that is populated by the customer at user terminal 302. The subsystem server 320 uses undisclosed algorithms, which are protected from view behind a firewall and security 308. That is, each subsystem provider uses his proprietary algorithm to develop and configure a subsystem that comports with the user's requirements according to the toolset 310. For example, refer again to FIG. 5, which depicts a webpage 500 that is populated with information from an exemplary toolset 310a. Webpage 500 is sent to a vendor who is operating subsystem server 320a. The vendor's subsystem definition 306x running on subsystem server 320a directly captures the information in the active fields and determines what the performance requirements and available system resources are for the requested subsystem. In addition to the information shown in FIG. 5, the system integrator operating sizing server 318 may also define what hardware and/or software is available, as well as any other hardware/software incompatibility issues that the system integrator may anticipate.

Whether the subsystem server 320a directly or indirectly manipulates toolset 310a, subsystem server 320a then creates a subsystem 1 definition 306a that meets the requirements found in toolset 310a. The creation of subsystem 1 definition 306a is accomplished in any manner chosen by the vendor who is operating subsystem server 320a. For example, the vendor may host an automatic system that configures the requested subsystem using data from a webpage (such as webpage 500) or directly from the toolset (such as toolset 310a). It is significant to note that the algorithm used by the subsystem vendor is preferably not revealed to the system integrator or any other outside party, especially other subsystem vendors.

The vendor then tests the configured subsystem to ensure that the subsystem meets the requirements of the toolset 310. Each subsystem server 320 (including subsystem server 320a) then sends a responsive subsystem definition 306 (e.g., subsystem 1 definition 306a from subsystem server 320a), preferably in XML format, back to sizing server 318.

FIG. 6 depicts a webpage 600 that has been populated by an exemplary subsystem definition 306. For example, assume that subsystem 1 definition 306a is for an e-mail program that meets the requirements described in webpage 500 in FIG. 5. The XML formatted subsystem 1 definition 306a then populates active fields in webpage 600. Such active windows may include definitions of performance capability (e.g., "Required attachment size") as well as required resources (e.g., "Required HDD access time," "Server interface," etc.). In addition, the XML formatted subsystem 1 definition 306a also populates active fields for other characteristics of the e-mail subsystem, such as the "Program name," and "Price." In addition, the XML formatted subsystem 1 definition 306a can populate information about "Incompatible software" and "Incompatible hardware" that may or not be in toolset 310a. That is, toolset 310a may or may not describe other hardware or software that is planned for a system to which subsystem 1 definition 306a is incompatible. In exemplary webpage 600, subsystem 1 definition 306a is described as being incompatible with Microsoft® Outlook™ Version 6.0, and is also will not operate properly if there is an Enhanced Integrated Drive Electronics (EIDE) compliant Compact Disk-Read Only Memory (CD-ROM) drive. Note that it is preferably the responsibility of the system integrator to handle hardware and software incompatibility issues, just as it is the responsibility of the system integrator to optimally configure the system requested by the customer.

Figure 7:
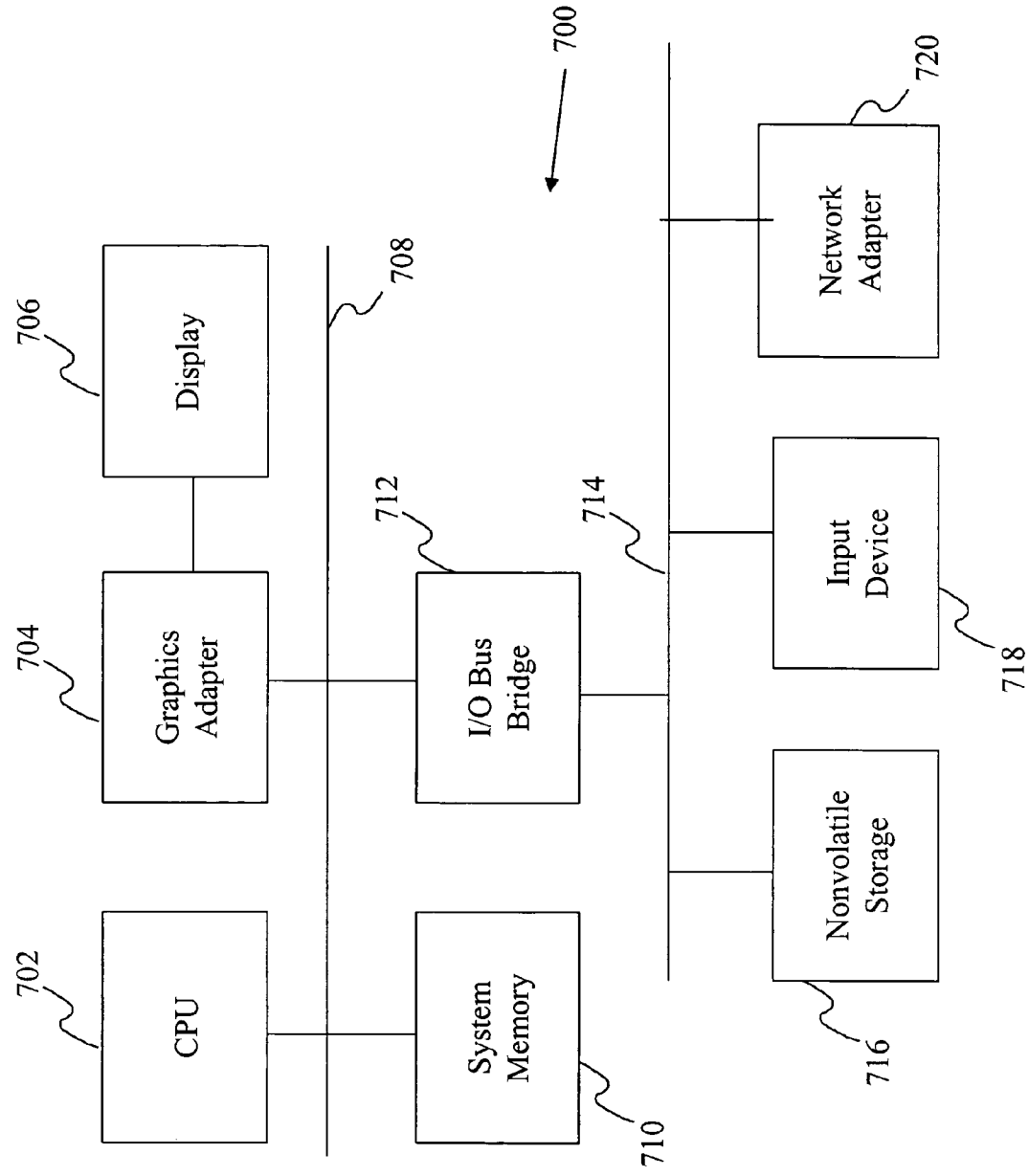
FIG. 7 illustrates an exemplary data processing system appropriate for use as a user terminal, a sizing server, or a subsystem server according to the present invention.

With reference now to FIG. 7, there is depicted a block diagram of a data processing system 700 appropriate for use as user terminal 302, sizing server 318, and/or each subsystem server 320. Preferably, user terminal 302, sizing server 318, and each subsystem server 320 is a different data processing system, although in an alternatively embodiment, the function and operations of one or more of user terminal 302, sizing server 318, and each subsystem server 320 may be performed by a same data processing system, such as data processing system 700 in which a preferred embodiment of the present invention may be implemented. Data processing system 700 may be, for example, one of the models of personal or server computers available from International Business Machines Corporation of Armonk, N.Y. Data processing system 700 includes a central processing unit (CPU) 702, which is connected to a system bus 708. In the exemplary embodiment, data processing system 700 includes a graphics adapter 704 also connected to system bus 708, for providing user interface information to a display 706.

Also connected to system bus 708 are a system memory 710 and an input/output (I/O) bus bridge 712. I/O bus bridge 712 couples an I/O bus 714 to system bus 708, relaying and/or transforming data transactions from one bus to the other. Peripheral devices such as nonvolatile storage 716, which may be a hard disk drive, and input device 718, which may include a conventional mouse, a trackball, or the like, is connected to I/O bus 714. Also connected to I/O bus 714 is a network adapter 720 for connection to a network (not shown).

The exemplary embodiment shown in FIG. 7 is provided solely for the purposes of explaining the invention and those skilled in the art will recognize that numerous variations are possible, both in form and function. For instance, data processing system 700 might also include a compact disk read-only memory (CD-ROM) or digital versatile disk (DVD) drive, a sound card and audio speakers, and numerous other optional components. All such variations are believed to be within the spirit and scope of the present invention.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such single-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention thus provides a method for sizing a computer system in which different subsystem components are able to be separately defined and then brought together to provide a total solution to the sizing problem. Each vendor of the different subsystems is able to configure his subsystem to the exact specifications of a system integrator without revealing proprietary information about the subsystem. The total system is then assembled by the system integrator in a compartmentalized and secure manner.

The figures of the present disclosure describe an exemplary subsystem that is an e-mail program. Note, however, that the present invention as described is applicable for use with any type of hardware or software subsystem described by a toolset. For example, the disclosed invention is also useful in creating a hardware system such as an airplane or a ship, in which each of the subsystems (e.g., engines, fuselage, wing, avionics) are securely and independently developed and hosted by a vendor, who then offers current solutions based on criteria supplied by the manufacturer.

Thus, while the invention has been particularly shown and described with reference to a preferred embodiment, it will be understood by those skilled in the art that various changes in form and detail may be made therein without departing from the spirit and scope of the invention.

What is claimed is:

1. A method for subsystem vendors to meet performance parameters and sizing requirements of computer subsystems when developing the computer subsystems, wherein the computer subsystems are combined to create a computer system, the method comprising:

coupling, via a network, a sizing server to a user terminal, wherein the sizing server is utilized by a computer system integrator to combine computer subsystems when building a computer system, and wherein the user terminal is used by an end user of a computer system;

coupling, via the network, the sizing server to a plurality of subsystem servers, wherein the plurality of subsystem servers are used by different subsystem vendors to create computer subsystems that are used to make up the computer system;

storing a first computer subsystem design toolset within the sizing server, wherein the first computer subsystem design toolset is a template with fields that are populated by the end user to define first desired subsystem-level performance parameters and sizing requirements that are required of the computer system, by a first computer subsystem, at runtime;

transmitting the first computer subsystem design toolset from the sizing server to the user terminal;

receiving, at the sizing server, a user-populated first computer subsystem design toolset from the user terminal, wherein the user-populated first computer subsystem design toolset comprises inputs to the fields in the first computer subsystem design toolset that have been entered by the end user at the user terminal, wherein the inputs define the first desired subsystem-level performance parameters and sizing requirements for the first computer subsystem that have been set by the end user;

transmitting the user-populated first computer subsystem design toolset from the sizing server to the subsystem servers, wherein a first subsystem server, from the multiple subsystem servers, utilizes the user-populated first computer subsystem design toolset to develop the first computer subsystem after performing a sizing analysis for the first computer subsystem, wherein the sizing analysis utilizes the inputs from the user-populated first computer subsystem design toolset to develop a proposed computer subsystem design, wherein the sizing analysis further determines whether the proposed computer subsystem design developed in the first subsystem server meets the first desired subsystem-level performance parameters and sizing requirements that have been set for the first computer subsystem by the end user of the computer system, wherein the sizing analysis determines whether the computer system complies with computer resource requirements of the proposed computer subsystem design, and wherein performance evaluation data generated by the first subsystem server for use in the sizing analysis is shielded from the sizing server by a security firewall at the first subsystem server;

receiving, at the sizing server, a first definition file from the first subsystem server, wherein the first definition file is created at the first subsystem server, wherein the first definition file describes the first computer subsystem that uses the proposed computer subsystem design that was created at the first subsystem server and that meets the first desired subsystem-level performance parameters and sizing requirements for the first computer subsystem, wherein the proposed computer subsystem design is developed and tested by the first subsystem server in response to and in compliance with desired subsystem-level performance and sizing requirements for the first computer subsystem that were entered into the first computer subsystem design toolset by the end user, and wherein the first definition file comprises a definition of computer resources in the computer system that are required by the first computer subsystem at runtime;

receiving, at the sizing server, a notification from the first subsystem server to the computer system integrator that the first definition file for the first computer subsystem and the first computer subsystem are available to the sizing server; and incorporating, by the sizing server, the first computer subsystem into the computer system, wherein the first computer subsystem was created by the first subsystem server based on the proposed computer subsystem design created in the first subsystem server.

2. The method of claim 1, further comprising:

storing a second computer subsystem design toolset within the sizing server, wherein the second computer subsystem design toolset is a template with fields that are populated by the end user to define second desired subsystem-level performance parameters and sizing requirements that are required of the computer system, by a second computer subsystem, at runtime;

transmitting the second computer subsystem design toolset from the sizing server to the user terminal;

receiving, at the sizing server, a user-populated second computer subsystem design toolset from the user terminal, wherein the user-populated second computer subsystem design toolset comprises inputs to the fields in the second computer subsystem design toolset that have been entered by the end user at the user terminal, wherein the inputs define the second desired subsystem-level performance parameters and sizing requirements for the second computer subsystem that have been set by the end user;

transmitting the user-populated second computer subsystem design toolset from the sizing server to the subsystem servers, wherein a second subsystem server, from the multiple subsystem servers, utilizes the user-populated second computer subsystem design toolset to develop the second computer subsystem after performing a sizing analysis for the second computer subsystem, wherein the sizing analysis utilizes the inputs from the user-populated second computer subsystem design toolset to develop a proposed computer subsystem design, wherein the sizing analysis further determines whether the proposed computer subsystem design developed in the second subsystem server meets the second desired subsystem-level performance parameters and sizing requirements that have been set for the second computer subsystem by the end user for the computer system, wherein the sizing analysis determines whether the computer system satisfies computer resource requirements of the proposed computer subsystem design, and wherein performance evaluation data generated by the second subsystem server for use in the sizing analysis is shielded from the sizing server by a security firewall at the second subsystem server;

receiving, at the sizing server, a second definition file from the second subsystem server, wherein the second definition file is created at the second subsystem server, wherein the second definition file describes the second computer subsystem that uses the proposed computer subsystem design that was created at the second subsystem server and that meets the second desired subsystem-level performance parameters and sizing requirements for the second computer subsystem, wherein the proposed computer subsystem design is developed and tested by the second subsystem server in response to and in compliance with desired subsystem-level performance and sizing requirements for the second computer subsystem that were entered into the second computer subsystem design toolset by the end user, and wherein the second definition file comprises a definition of computer resources in the computer system that are required by the second computer subsystem at runtime;

receiving a notification, from the second subsystem server to the computer system integrator, that the second definition file for the second computer subsystem and the second computer subsystem are available to the sizing server; and incorporating, by the sizing server, the second computer subsystem into the computer system, wherein the second computer subsystem was created by the second subsystem server based on the proposed computer subsystem design created in the second subsystem server.

3. The method of claim 2, wherein the first subsystem server and the second subsystem server are a same server.

4. The method of claim 2, wherein the first subsystem server is unable to access, from the sizing server, a computer subsystem design that was created by the second computer subsystem server.

5. The method of claim 1, wherein the first definition file is transmitted to the sizing server as an eXtended Markup Language (XML) file.

6. The method of claim 5, wherein the XML file for the first definition file populates active fields of a subsystem specification webpage, wherein the subsystem specification webpage is provided by the sizing server, and wherein the active fields comprise performance information and price information for the first computer subsystem.

7. The method of claim 1,
wherein the first definition file comprises information pertaining to computer resources with which the first computer subsystem is incompatible.

8. A computer system development system, comprising:
a user terminal;
a sizing server coupled to the user terminal, wherein the sizing server is utilized by a computer system integrator to combine computer subsystems when building a computer system, and wherein the user terminal is used by an end user of a computer system; and
a plurality of subsystem servers coupled to the sizing server, wherein the plurality of subsystem servers are used by different subsystem vendors to create computer subsystems that are used to make up the computer system, wherein:
the sizing server stores a first computer subsystem design toolset, wherein the first computer subsystem design toolset is a template with fields that are populated by the end user to define first desired subsystem-level performance parameters and sizing requirements that are required of the computer system, by a first computer subsystem, at runtime;
the sizing server transmits the first computer subsystem design toolset from the sizing server to the user terminal;
the sizing server receives a user-populated first computer subsystem design toolset from the user terminal, wherein the user-populated first computer subsystem design toolset comprises inputs to the fields in the first computer subsystem design toolset that have been entered by the end user at the user terminal, wherein the inputs define the first desired subsystem-level performance parameters and sizing requirements for the first computer subsystem that have been set by the end user;
the sizing server transmits the user-populated first computer subsystem design toolset to the subsystem servers, wherein a first subsystem server, from the multiple subsystem servers, utilizes the user-populated first computer subsystem design toolset to develop the first computer subsystem after performing a sizing analysis for the first computer subsystem, wherein the sizing analysis utilizes the inputs from the user-populated first computer subsystem design toolset to develop a proposed computer subsystem design, wherein the sizing analysis further determines whether the proposed computer subsystem design developed in the first subsystem server meets the first desired subsystem-level performance parameters and sizing requirements that have been set for the first computer subsystem by the end user of the computer system, wherein the sizing analysis determines whether the computer system meets computer resource requirements of the proposed computer subsystem design, and wherein performance evaluation data generated by the first subsystem server for use in the sizing analysis is shielded from the sizing server by a security firewall at the first subsystem server;
the sizing server receives a first definition file from the first subsystem server, wherein the first definition file is created at the first subsystem server, wherein the first definition file describes the first computer subsystem that uses the proposed computer subsystem design that was created at the first subsystem server and that meets the first desired subsystem-level performance parameters and sizing requirements for the first computer subsystem, wherein the proposed computer subsystem design is developed and tested by the first subsystem server in response to and in compliance with desired subsystem-level performance and sizing requirements for the first computer subsystem that were entered into the first computer subsystem design toolset by the end user, and wherein the first definition file comprises a definition of computer resources in the computer system that are required by the first computer subsystem at runtime;
the sizing server receives a notification from the first subsystem to the computer system integrator that the first definition file for the first computer subsystem and the first computer subsystem are available to the sizing server; and
the sizing server incorporates the first computer subsystem into the computer system, wherein the first computer subsystem was created by the first subsystem server based on the proposed computer subsystem design created in the first subsystem server.

9. The computer system development system of claim 8, wherein:
the sizing server stores a second computer subsystem design toolset within the sizing server, wherein the second computer subsystem design toolset is a template with fields that are populated by the end user to define second desired subsystem-level performance parameters and sizing requirements that are required of the computer system, by a second computer subsystem, at runtime;
the sizing server transmits the second computer subsystem design toolset from the sizing server to the user terminal;
the sizing server receives a user-populated second computer subsystem design toolset from the user terminal, wherein the user-populated second computer subsystem design toolset comprises inputs to the fields in the second computer subsystem design toolset that have been entered by the end user at the user terminal, wherein the inputs define the second desired subsystem-level performance parameters and sizing requirements for the second computer subsystem that have been set by the end user;
the sizing server transmits the user-populated second computer subsystem design toolset from the sizing server to the subsystem servers, wherein a second subsystem server, from the multiple subsystem servers, utilizes the user-populated second computer subsystem design toolset to develop the second computer subsystem after performing a sizing analysis for the second computer subsystem, wherein the sizing analysis utilizes the inputs from the user-populated second computer subsystem design toolset to develop a proposed computer subsystem design, wherein the sizing analysis further determines whether the proposed computer subsystem design developed in the second subsystem server meets the second desired subsystem-level performance parameters and sizing requirements that have been set for the second computer subsystem by the end user for the computer system, wherein the sizing analysis determines whether the computer system complies with computer resource requirements of the proposed computer subsystem design, and wherein performance evaluation data generated by the second subsystem server for use in the sizing analysis is shielded from the sizing server by a security firewall at the second subsystem server;
the sizing server receives a second definition file from the second subsystem server, wherein the second definition file is created at the second subsystem server, wherein the second definition file describes the second computer subsystem that uses the proposed computer subsystem design that was created at the second subsystem server and that meets the second desired subsystem-level performance parameters and sizing requirements for the second computer subsystem, wherein the proposed computer subsystem design is developed and tested by the second subsystem server in response to and in compliance with desired subsystem-level performance and sizing requirements for the second computer subsystem that were entered into the second computer subsystem design toolset by the end user, and wherein the second definition file comprises a definition of computer resources in the computer system that are required by the second computer subsystem at runtime;

the sizing server receives a notification, from the second subsystem server to the computer system integrator, that the second definition file for the second computer subsystem and the second computer subsystem are available to the sizing server; and the sizing server incorporates the second computer subsystem into the computer system, wherein the second computer subsystem was created by the second subsystem server based on the proposed computer subsystem design created in the second subsystem server.

10. The computer system development system of claim 9, wherein the first subsystem server and the second subsystem server are a same server.

11. The computer system development system of claim 9, wherein the first subsystem server is unable to access, from the sizing server, a computer subsystem design specification that was created by the second computer subsystem server.

12. The computer system development system of claim 8, wherein the first definition file is transmitted to the sizing server as an eXtended Markup Language (XML) file.

13. The computer system development system of claim 12, wherein the XML file for the first definition file populates active fields of a subsystem specification webpage, wherein the subsystem specification webpage is provided by the sizing server, and wherein the active fields comprise performance information and price information for the first computer subsystem.

14. The computer system development system of claim 13, wherein the first definition file comprises information pertaining to computer resources with which the first computer subsystem is incompatible.

15. A computer program product embodied in a computer storage medium, including computer program code embodied in said computer storage medium that when executed by a central processing unit (CPU), performs functionality comprising:

logically coupling, via a network, a sizing server to a user terminal, wherein the sizing server is utilized by a computer system integrator to combine computer subsystems when building a computer system, and wherein the user terminal is used by an end user of a computer system;

logically coupling, via the network, the sizing server to a plurality of subsystem servers, wherein the plurality of subsystem servers are used by different subsystem vendors to create computer subsystems that are used to make up the computer system;

storing a first computer subsystem design toolset within the sizing server, wherein the first computer subsystem design toolset is a template with fields that are populated by the end user to define first desired subsystem-level performance parameters and sizing requirements that are required of the computer system, by a first computer subsystem, at runtime;

transmitting the first computer subsystem design toolset from the sizing server to the user terminal;

receiving, at the sizing server, a user-populated first computer subsystem design toolset from the user terminal, wherein the user-populated first computer subsystem design toolset comprises inputs to the fields in the first computer subsystem design toolset that have been entered by the end user at the user terminal, wherein the inputs define the first desired subsystem-level performance parameters and sizing requirements for the first computer subsystem that have been set by the end user;

transmitting the user-populated first computer subsystem design toolset from the sizing server to the subsystem servers, wherein a first subsystem server, from the multiple subsystem servers, utilizes the user-populated first computer subsystem design toolset to develop the first computer subsystem after performing a sizing analysis for the first computer subsystem, wherein the sizing analysis utilizes the inputs from the user-populated first computer subsystem design toolset to develop a proposed computer subsystem design, wherein the sizing analysis further determines whether the proposed computer subsystem design developed in the first subsystem server meets the first desired subsystem-level performance parameters and sizing requirements that have been set for the first computer subsystem by the end user of the computer system, wherein the sizing analysis determines whether the computer system meets computer resource requirements of the proposed computer subsystem design, and wherein performance evaluation data generated by the first subsystem server for use in the sizing analysis is shielded from the sizing server by a security firewall at the first subsystem server;

receiving, at the sizing server, a first definition file from the first subsystem server, wherein the first definition file is created at the first subsystem server, wherein the first definition file describes the first computer subsystem that uses the proposed computer subsystem design that was created at the first subsystem server and that meets the first desired subsystem-level performance parameters and sizing requirements for the first computer subsystem, wherein the proposed computer subsystem design is developed and tested by the first subsystem server in response to and in compliance with desired subsystem-level performance and sizing requirements for the first computer subsystem that were entered into the first computer subsystem design toolset by the end user, and wherein the first definition file comprises a definition of computer resources in the computer system that are required by the first computer subsystem at runtime;

receiving, at the sizing server, a notification from the first subsystem server to the computer system integrator that the first definition file for the first computer subsystem and the first computer subsystem are available to the sizing server; and incorporating, by the sizing server, the first computer subsystem into the computer system, wherein the first computer subsystem was created by the first subsystem server based on the proposed computer subsystem design created in the first subsystem server.

16. The computer program product of claim 15, wherein the functionality further comprises:

storing a second computer subsystem design toolset within the sizing server, wherein the second computer subsystem design toolset is a template with fields that are populated by the end user to define second desired subsystem-level performance parameters and sizing requirements that are required of the computer system, by a second computer subsystem, at runtime;

transmitting the second computer subsystem design toolset from the sizing server to the user terminal;

receiving, at the sizing server, a user-populated second computer subsystem design toolset from the user terminal, wherein the user-populated second computer subsystem design toolset comprises inputs to the fields in the second computer subsystem design toolset that have been entered by the end user at the user terminal, wherein the inputs define the second desired subsystem-level performance parameters and sizing requirements for the second computer subsystem that have been set by the end user;

transmitting the user-populated second computer subsystem design toolset from the sizing server to the subsystem servers, wherein a second subsystem server, from the multiple subsystem servers, utilizes the user-populated second computer subsystem design toolset to develop the second computer subsystem after performing a sizing analysis for the second computer subsystem, wherein the sizing analysis utilizes the inputs from the user-populated second computer subsystem design toolset to develop a proposed computer subsystem design, wherein the sizing analysis further determines whether the proposed computer subsystem design developed in the second subsystem server meets the second desired subsystem-level performance parameters and sizing requirements that have been set for the second computer subsystem by the end user for the computer system, wherein the sizing analysis determines whether the computer system complies with computer resource requirements of the proposed computer subsystem design, and wherein performance evaluation data generated by the second subsystem server for use in the sizing analysis is shielded from the sizing server by a security firewall at the second subsystem server;

receiving, at the sizing server, a second definition file from the second subsystem server, wherein the second definition file is created at the second subsystem server, wherein the second definition file describes the second computer subsystem that uses the proposed computer subsystem design that was created at the second subsystem server and that meets the second desired subsystem-level performance parameters and sizing requirements for the second computer subsystem, wherein the proposed computer subsystem design is developed and tested by the second subsystem server in response to and in compliance with desired subsystem-level performance and sizing requirements for the second computer subsystem that were entered into the second computer subsystem design toolset by the end user, and wherein the second definition file comprises a definition of computer resources in the computer system that are required by the second computer subsystem at runtime;

receiving a notification, from the second subsystem server to the computer system integrator, that the second definition file for the second computer subsystem and the second computer subsystem are available to the sizing server; and incorporating, by the sizing server, the second computer subsystem into the computer system, wherein the second computer subsystem was created by the second subsystem server based on the proposed computer subsystem design created in the second subsystem server.

17. The computer program product of claim 16, wherein the first subsystem server and the second subsystem server are a same server.

18. The computer program product of claim 16, wherein the first subsystem server is unable to access, from the sizing server, a computer subsystem design that was created by the second computer subsystem server.

19. The computer program product of claim 15, wherein the first definition file is transmitted to the sizing server as an eXtended Markup Language (XML) file.

20. The computer program product of claim 19, wherein the XML file for the first definition file populates active fields of a subsystem specification webpage, wherein the subsystem specification webpage is provided by the sizing server, and wherein the active fields comprise performance information and price information for the first computer subsystem.

* * * * *

UNITED STATES PATENT AND TRADEMARK OFFICE
CERTIFICATE OF CORRECTION

PATENT NO. : 7,587,706 B2 Page 1 of 1
APPLICATION NO. : 10/845872
DATED : September 8, 2009
INVENTOR(S) : Maher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Twenty-first Day of September, 2010

David J. Kappos
*Director of the United States Patent and Trademark Office*